United States Patent Office 3,347,800
Patented Oct. 17, 1967

3,347,800
SUBSTITUTED PHOSPHINOBORINE POLYMERS
Marvin H. Goodrow, Claremont, Ross I. Wagner, Whittier, and Frederick F. Caserio, Jr., Pasadena, Calif., assignors to American Potash & Chemical Corporation, Los Angeles, Calif., a corporation of Delaware
No Drawing. Filed Apr. 30, 1962, Ser. No. 191,351
6 Claims. (Cl. 260—2)

The present invention relates, in general, to the preparation of B-substituted phosphinoborine polymers and to the polymers thus prepared. More specifically, the invention relates to B-functionally substituted phosphinoborine polymers and to their methods of preparation.

It is known that phosphinoborine polymers are of value where high thermal and hydrolytic stability are desired. These materials are also known for their value as high temperature dielectric materials. One specific application for these materials is as laminating resins which, when used, for example, in combination with fibre glass, are very resistant to thermal, chemical and electrical attack.

It is often desired to vary the physical properties of phosphinoborine polymers to meet the needs of a specific application. Considerable difficulty has been encountered in tailoring specific phosphinoborine polymers to the desired characteristics due to the difficulty of attaching various reactive substituents to the polymer. Selection of specific groups can control to a certain extent, for example, the solubility, melting point, reactivity and compatibility of a polymer in a given system.

The preparative methods heretofore available for the manufacture of B-functionally substituted phosphinoborine polymers have, in general, been seriously limited to one special class of functional substituents and have been unable to accomplish the addition of many of the more important reactive functional substituents to phosphinoborine polymers.

Broadly, in accordance with the present invention, it has been determined that B-functionally substituted phosphinoborine polymers can be prepared by treating the corresponding B-halophosphinoborine polymers with certain metallic salts.

More specifically, the process of the present invention comprises reacting (I) a B-halophosphinoborine polymer having the general formulas:

(1) $[R_4R_3PBR_1R_2]_n$ (2) $BH_3[R_4R_3PBR_1R_2]_nA$ mixtures and copolymers thereof, with (II) a metallic salt having the formula $MY_v$.

Referring specifically to the metallic salt; M, the cation, is a metallic element which can be any of Group Ia, Ib, IIa or IIb metals or boron, aluminum, tin or lead. The anion, Y, can be any of —CN, —NCO, —NCS, —NR$_5$R$_6$, —NO$_2$, —N$_3$, —SR$_5$, —SCN, —PR$_5$R$_6$, —AsR$_5$R$_6$, —OR$_5$, —SeR$_5$, —TeR$_5$ or —SO$_3$R$_5$. The substituents R$_5$ and R$_6$ can be any of the monovalent hydrogen, alicyclic, acyclic or arene substituents. When R$_5$ and R$_6$ are taken together as one single substituent, they can be any of the bivalent alicyclic, acyclic or arene substituents. The subscript $v$ is indicative of the valence of M.

In the above formulas, R$_1$ and R$_2$ are each independently taken from the following group: halogen, hydrogen, aryl, alkyl, alkaryl and cycloalkyl substituents; at least one of said R$_1$ and R$_2$ being halogen in each of said polymers 1 and 2, each R$_1$ and R$_2$ substituent being independently selected for each monomeric unit. The substituents, R$_3$ and R$_4$, can be any of the single substituents, alkyl, aryl, alkaryl or cycloalkyl, each substituent being independently selected for each monomeric unit; or taken together as one single substituent, arylene, alkylene, alkarylene or cycloalkylene. The substituent R can be any of arylene, alkylene, alkarylene or cycloalkylene.

The integer $n$ is indicative of the degree of polymerization of the polymers. The terminal groups of linear polymer 2 on one end of the chain are basic in nature, designated —A, and can conveniently be tertiary amines, tertiary phosphines, secondary amines or secondary phosphines. While we do not wish to be limited to any theory, it is believed that the other end of the polymer 2 is blocked by an acidic —$B(R_1)_3$ group wherein R$_1$ is as defined above.

The B-halophosphinoborine polymers designated above as 1 and 2 are conveniently prepared by the halogenation of the corresponding B-hydridophosphinoborine polymer. One convenient method of halogenation is the treatment of the B-hydridopolymer with an N-halocarbamyl compound as is more specifically described in assignee's U.S. Patent No. 3,240,807.

The B-functionally substituted phosphinoborine polymers of this invention have the general formulas:

(a) $[R_4R_3PB(E)_2]_n$ (b) $BH_3[R_4R_3PB(E)_2]_nA$

In the above formulas, R$_3$, R$_4$, A and $n$, have the same meaning as above, and E can be any of monovalent hydrogen, alicyclic, acyclic, arene or Y substituents; provided there is at least one Y substituent in each of said polymers $a$ and $b$. Each E substituent is independently selected for each position in each monomeric unit of these polymers. Each Y substituent is independently selected for each position in each monomeric unit of these polymers from the group consisting of —CN, —NCO, —NCS, —NR$_5$R$_6$, —NO$_2$, —N$_3$, —SR$_5$, —SCN, —PR$_5$R$_6$, —AsR$_5$R$_6$, —OR$_5$, —SeR$_5$, TeR$_5$ and —SO$_3$R$_5$. The substituents R$_5$ and R$_6$ have the same meaning as above.

The B-organophosphinoborine polymers of this invention can be recovered, for example, from this reaction as a liquid, a solid, a solution dissolved in a suitable solvent or as a solid precipitate. The recovered polymer can be isolated by any of the conventional isolation procedures, such as crystallization, filtration and the like.

In order to illustrate the invention even more clearly, the following specific examples are set forth. It will be understood, of course, that these examples are for illustrative purposes only and are not intended to limit the invention in any way. In the following examples and throughout the specification and appended claims, all parts and percentages are by weight, unless otherwise indicated.

Examples I to V are illustrative of the preparation of cyano substituted polymers.

Example I

To a solution containing 0.2005 g. (0.666 mmole) of [(CH$_3$)$_2$PBH$_2$]$_2$(CH$_3$)$_2$PBHBr in 6 ml. of dimethylformamide (dried by azeotropic distillation with benzene) is added 0.0684 g. (1.396 mmoles) of sodium cyanide which only partially dissolves. Upon heating on the steam bath, the solution becomes light yellow in color as more of the sodium cyanide dissolves. Heating is continued for 5 hours. On dilution with 25 ml. of distilled water, a fine, white, needle-like crystalline precipitate forms. The solid is collected on a filter, and washed thoroughly with additional distilled water. After thorough drying, there is obtained 0.1456 g. (89%) of

[(CH$_3$)$_2$PBH$_2$]$_2$(CH$_3$)$_2$PB(CN)H

M.P. 106.5–108° C.

Example II

Treatment of 0.1307 g. (0.510 mmole) of $$[(CH_3)_2PBH_2]_2(CH_3)_2PBHCl$$

with 0.1003 g. (2.05 mmoles) of sodium cyanide in 8 ml. of dry dimethylformamide at 100° C. for 7 hours with constant stirring followed by cooling and diluting with 20 ml. of water, yields 0.1112 g. (0.451 mmole, 88%) of $[(CH_3)_2PBH_2]_2(CH_3)_2PB(CN)H$, M.P. 106–108° C.

Example III

A mixture consisting of 1.0153 g. (2.921 mmoles) of $[(CH_3)_2PBH_2]_2(CH_3)_2PBHI$ and 0.2862 g. (5.84 mmoles) of sodium cyanide in 15 ml. of absolute ethanol is heated under reflux for 8 hours. After cooling to room temperature, the solids are removed by filtration with the aid of an additional 10 ml. of ethanol. Dilution of the ethanol filtrate with 25 ml. of water forms a fine, white crystalline precipitate of $$[(CH_3)_2PBH_2]_2(CH_3)_2PB(CN)H$$

M.P. 104–107° C., which after thorough drying weighs 0.6740 g. (2.733 mmoles, 93.6%). Vapor phase chromatographic analysis shows no impurities.

Example IV

To a solution of 0.1004 g. (0.264 mmole) of $$[(CH_3)_2PBHBr]_2(CH_3)_2PBH_2$$

in 3.0 ml. of dry dimethylformamide is added 0.0510 g. (1.040 mmoles) of sodium cyanide. The mixture is heated for 6 hours on the steam bath during which time the sodium cyanide dissolves slowly. On dilution with 10 ml. of water, a white, flaky, crystalline precipitate forms and is separated by filtration. On thorough drying, there is obtained a 55% (0.0397 g.) yield of crude $$[(CH_3)_2PB(CN)H]_2(CH_3)_2PBH_2$$

M.P. 122.5–125° C.

Sublimation in high vacuum at room temperature removes 1.9% $[(CH_3)_2PBH_2]_2(CH_3)_2PB(CN)H$ (determined by vapor phase chromatography);

$$[(CH_3)_2PB(CN)H]_2(CH_3)_2PBH_2$$

is obtained on subliming the residue at 95–105° C. An analytical sample is prepared by crystallization from ethanol-water which yields fine white needles, M.P. 127–128° C.

Example V

A quantity of $[(CH_3)_2PBH_2]_2(CH_3)_2PB(CN)H$ is prepared utilizing 5.0009 g. (13.78 mmoles) of $$[(CH_3)_2PBH_2]_2(CH_3)_2PBHI$$

(assay 95.8%) and 1.4848 g. (30.29 mmoles) of sodium cyanide in 50 ml. of ethanol. There is obtained 3.238 g. (13.13 mmoles, 95.6% yield) of product, M.P. 104–107° C., which is analyzed by vapor phase chromatography as 97.9% $[(CH_3)_2PBH_2]_2(CH_3)_2PB(CN)H$, 0.2% $[(CH_3)_2PBH_2]_3$, 1.6% $[(CH_3)_2PBH_2]_2(CH_3)_2PBHI$ and 0.3% $[(CH_3)_2PBHI]_2(CH_3)_2PBH_2$.

Examples VI and VII are illustrative of the preparation of isocyanato substituted polymers.

Example VI

Employing a 50 ml. two-neck flask equipped with a thermometer, magnetic stirring bar and condenser, a heterogeneous mixture of 0.2146 g. (0.617 mmole) of $$[(CH_3)_2PBH_2]_2(CH_3)_2PBHI$$

and 0.2000 g. (2.47 mmoles) of potassium cyanate in 10 ml. of dimethylformamide (dried by azeotropic distillation with benzene) is heated at 100±5° C. for 8 hours. The mixture is cooled to room temperature and diluted with 10 ml. of water which affects the precipitation of a white crystalline solid. After cooling to −20° C., the precipitate is collected, washed with 5 ml. of water and air dried. There is obtained 0.1380 g. (85% crude yield) of $[(CH_3)_2PBH_2]_2(CH_3)_2PB(NCO)H$, M.P. 57–63° C. Two crystallizations from ethanol-water (5:3) significantly raises the melting point of the product to 69.5–71.5° C. (0.0931 g., 57%). An additional crystallization affords even purer material, 0.0803 g., M.P. 71–72° C. (assaying 99.0% by vapor phase chromatography). The infrared spectrum of this material displays bands characteristic of the phosphinoborine trimer nucleus and the isocyanato function (2280 cm.$^{-1}$).

In a second experiment, 1.0044 g. (2.890 mmoles) of $[(CH_3)_2PBH_2]_2(CH_3)_2PBHI$, 0.9448 g. (11.65 mmoles) of potassium cyanate and 20 ml. of dimethylformamide (distilled from calcium hydride) are heated at 100±3° C. for 7 hours. The fine, white solid residue (potassium iodide) is collected after cooling the mixture to room temperature and is found to contain iodide ion by precipitation of silver iodide from an aqueous solution. The filtrate is cooled in an ice bath and slowly diluted with 20 ml. of water. The resulting microcrystalline precipitate is collected and air dried to yield 0.6275 g. (2.39 mmoles, 82.7%) of $[(CH_3)_2PBH_2]_2(CH_3)_2PB(NCO)H$, M.P. 71.0–72.5° C., which assays 96.6% by vapor phase chromatography.

Example VII

A heterogeneous mixture of 0.3017 g. (0.868 mmole) of $[(CH_3)_2PBH_2]_2(CH_3)_2PBHI$ and 0.1952 g. (1.302 mmoles) of silver cyanate in 10 ml. of benzene is heated at ca. 50° C. for 1 hour, whereupon the color of the mixture gradually changes from brown to black. The temperature is reduced to approximately 40° C. and maintained there for 4 hours. The resulting black residue is removed by filtration and the filtrate evaporated to dryness in a stream of argon. Sublimation under high vacuum provides what appeared to be two materials at a bath temperature of 40–70° C. The first material forms a hard white solid on the cold finger with the second forming long white needles on the surface. The two materials are separated mechanically to give 0.1731 g. of the hard solid, M.P. 67–74° C. (softened at 65° C.) which analyzes by vapor phase chromatography as 51.4%

$$[(CH_3)_2PBH_2]_2(CH_3)_2PB(NCO)H$$

46.6% $[(CH_3)_2PBH_2]_2(CH_3)_2PBHI$, 0.3%

$$[(CH_3)_2PBH_2]_3$$

and 1.7% unknown materials. The needles, 0.0469 g., M.P. 78–82° C., analyzes 79.7%

$$[(CH_3)_2PBH_2]_2(CH_3)_2PB(NCO)H$$

18.9% $[(CH_3)_2PBH_2]_2(CH_3)_2PBHI$ and 1.3% unknown materials. The calculated quantity of product in these two fractions is thus 0.1264 g. (0.481 mmole), representing a 55.4% yield.

Example VIII exemplifies the preparation of thiocyano substituted polymers.

Example VIII

A 50 ml. two-neck flask equipped with a thermometer, a glass-covered magnetic stirring bar and a water cooled condenser capped with a nitrogen inlet and outlet is charged with 0.1747 g. (0.503 mmole) of $$[(CH_3)_2PBH_2]_2(CH_3)_2PBHI$$

and 0.1500 g. (1.53 mmoles) of potassium thiocyanate, and 8 ml. of dry dimethylformamide which effects complete solution of the reactants. After heating for 8 hours at 100° C., the yellow-colored solution is cooled, and diluted with 20 ml. of water to give an opaque, milky mixture. On cooling at 0° C. overnight, the suspension coagulates to give 0.1192 g. (85% crude yield) of $$[(CH_3)_2PBH_2]_2(CH_3)_2PB(SCN)H$$

M.P. 57.5–59° C.

The infrared spectrum of the crude

[(CH$_3$)$_2$PBH$_2$]$_2$(CH$_3$)$_2$PB(SCN)H displays very strong characteristic absorption at 2120 cm.$^{-1}$. An analytical sample is prepared by crystallization of the crude material three times from ethanol-water (3:1) to yield white needles, M.P. 63–64° C.

Example IX exemplifies the preparation of mercapto substituted polymers.

*Example IX*

To a well-stirred solution of potassium hydrosulfide, prepared from 0.0998 g. (1.78 mmoles) of potassium hydroxide in 10 ml. of absolute ethanol, saturated with hydrogen sulfide is added 0.1817 g. (0.523 mmole) of

[(CH$_3$)$_2$PBH$_2$]$_2$(CH$_3$)$_2$PBHI

The solution is heated under reflux for 6 hours while maintaining it saturated with hydrogen sulfide by bubbling it into the solution. After cooling and diluting with 15 ml. of water, white needles deposit, 0.1000 g. (98.5%), M.P. 47–50° C. Two crystallizations from ethanol-water (1:1) followed by high vacuum sublimation at 35–41° C. provides an analytical sample of

[(CH$_3$)$_2$PBH$_2$]$_2$(CH$_3$)$_2$PB(SH)H

M.P. 50–51° C. The infrared spectrum shows a band at 2550 cm.$^{-1}$ characteristic of the S—H function.

Example X exemplifies the preparation of alkylthio substituted polymers.

*Example X*

A 50 ml. 2-neck flask is equipped with an inlet tube extending to the bottom of the flask, a reflux condenser capped with a nitrogen outlet, and a glass covered magnetic stirring bar. Sodium methanethiolate is prepared under a nitrogen atmosphere by adding 0.4021 g. (8.36 mmoles) of methyl mercaptan beneath the surface of a solution of 0.1348 g. (5.86 mmoles) of sodium in 10 ml. of absolute ethanol maintained at 0° C. by external cooling. After addition of the methyl mercaptan, the inlet tube is removed and 1.0013 g. (2.881 mmoles) of solid

[(CH$_3$)$_2$PBH$_2$]$_2$(CH$_3$)$_2$PBHI is introduced whereafter the opaque solution is heated under reflux for 21 hours. The solution is filtered to remove a trace quantity of insoluble material and the filtrate is diluted with 5 ml. of water which affects the precipitation of a crystalline solid. The mixture is cooled to −25° C., filtered and the product washed with 10 ml. of water to obtain 0.7105 g. (2.654 mmoles; 92.1% yield) of [(CH$_3$)$_2$PBH$_2$]$_2$(CH$_3$)$_2$PB(SCH$_3$)H, M.P. 60.0–60.5° C. The product, found by vapor phase chromatography to contain no impurity, is sublimed in high vacuum at a bath temperature of 30–50° C. to provide an analytical sample, M.P. 60–61° C.

Substantially the same procedures set forth in Example I, above, are employed in Examples XI to L, the reactants and major polymeric product of which are set forth in Table I.

TABLE I

| Example | MY$_v$ | B-Halophosphinoborine Polymer | B-Functionally Substituted Phosphinoborine Polymer |
|---|---|---|---|
| XI | NaCN | [(CH$_3$)$_2$PBCl$_2$]$_3$ | [(CH$_3$)$_2$PB(CN)$_2$]$_3$ |
| XII | AgCN | [(CH$_3$)$_2$PBI$_2$]$_3$ | [(CH$_3$)$_2$PB(CN)$_2$]$_3$ |
| XIII | KCN | [(CH$_3$)$_2$PBHBr]$_2$(CH$_3$)$_2$PBH$_2$ | [(CH$_3$)$_2$PBH(CN)]$_2$(CH$_3$)$_2$PBH$_2$ |
| XIV | K$_2$Hg(CN)$_4$ | [(CH$_3$)$_2$PBCl$_2$]$_3$ | [(CH$_3$)$_2$PB(CN)$_2$]$_3$ |
| XV | KOH | [(CH$_3$)$_2$PBH$_2$]$_2$(CH$_3$)$_2$PBHBr | [(CH$_3$)$_2$PBH$_2$]$_2$(CH$_3$)$_2$PBH(OH) |
| XVI | NaOC$_2$H$_5$ | [(CH$_3$)$_3$PBH$_2$]$_2$(CH$_3$)$_2$PBHI | [(CH$_3$)$_2$PBH$_2$]$_2$(CH$_3$)$_2$PBH(OC$_2$H$_5$) |
| XVII | KPH(CH$_3$) | [(C$_2$H$_5$)CH$_3$PBH$_2$](C$_2$H$_5$)CH$_3$PBHCl | [(C$_2$H$_5$)CH$_3$PBH$_2$]$_2$(C$_2$H$_5$)CH$_3$PBH[PH(CH$_3$)] |
| XVIII | Zn(CN)$_2$ | [(CH$_3$)$_2$PBCl$_2$]$_3$(CH$_3$)$_2$PBHCl | [(CH$_3$)$_2$PB(CN)$_2$]$_3$(CH$_3$)$_2$PBH(CN) |
| XIX | NaOCN | [(CH$_3$)$_2$PBHBr]$_2$(CH$_3$)$_2$PBH$_2$ | [(CH$_3$)$_2$PBH(NCO)]$_2$(CH$_3$)$_2$PBH$_2$ |
| XX | AgOSO$_2$CH$_3$ | [(C$_2$H$_5$)CH$_3$PBHCl]$_{40}$N(C$_2$H$_5$)$_3$ | [(C$_2$H$_5$)CH$_3$PBH(OSO$_2$CH$_3$)]$_{40}$N(C$_2$H$_5$)$_3$ |
| XXI | NaP(CH$_3$)$_2$ | [(CH$_3$)$_2$PBHBr]$_2$(CH$_3$)$_2$PBH$_2$ | [(CH$_3$)$_2$PBH[P(CH$_3$)$_2$]]$_2$(CH$_3$)$_2$PBH$_2$ |
| XXII | Mg(SCN)$_2$ | [CH$_2$(CH$_2$)$_5$PBHBr]$_3$ | [CH$_2$(CH$_2$)$_5$PBH(SCN)]$_3$ |
| XXIII | RbOC$_6$H$_5$ | [(cyclo-C$_6$H$_{11}$)$_2$PBH$_2$][(cyclo-C$_6$H$_{11}$)$_2$PBHI]$_2$ | [(cyclo-C$_6$H$_{11}$)$_2$PBH$_2$][(cyclo-C$_6$H$_{11}$)$_2$PBH(OC$_6$H$_5$)]$_2$ |
| XXIV | Sr(NO$_2$)$_2$ | [(C$_6$H$_5$)$_2$PBH$_2$]$_2$(C$_6$H$_5$)$_2$PBHCl | [(C$_6$H$_5$)$_2$PBH$_2$]$_2$(C$_6$H$_5$)$_2$PBH(NO$_2$) |
| XXV | Cd(CN)$_2$ | [(C$_6$H$_5$)CH$_3$PBHI]$_3$ | [(C$_6$H$_5$)CH$_3$PBH(CN)]$_3$ |
| XXVI | Sn(OH)$_2$ | [(n-C$_8$H$_{17}$)CH$_3$PBH$_2$]$_2$(n-C$_8$H$_{17}$)CH$_3$PBHBr | [(n-C$_8$H$_{17}$)CH$_3$PBH$_2$]$_2$(n-C$_8$H$_{17}$)CH$_3$PBH(OH) |
| XXVII | Pb(SCN)$_2$ | [(CH$_3$)$_2$PBHBr]$_{30}$P(CH$_3$)$_3$ | [(CH$_3$)$_2$PBH(NCS)]$_{30}$P(CH$_3$)$_3$ |
| XXVIII | NaTeC$_6$H$_5$ | [(C$_3$H$_7$)CH$_3$PBH$_2$]$_2$(C$_3$H$_7$)CH$_3$PBHCl | [(C$_3$H$_7$)CH$_3$PBH$_2$]$_2$(C$_3$H$_7$)CH$_3$PBH(TeC$_6$H$_5$) |
| XXIX | Ba[N(C$_2$H$_5$)$_2$]$_2$ | [CH$_2$(CH$_2$)$_4$PBH$_2$]$_2$CH$_2$(CH$_2$)$_4$PBHI | [CH$_2$(CH$_2$)$_4$PBH$_2$]$_2$CH$_2$(CH$_2$)$_4$PBH[N(C$_2$H$_5$)$_2$] |
| XXX | NaAs(CH$_3$)$_2$ | [(p-CH$_3$C$_6$H$_4$)$_2$PBHI]$_3$ | [(p-CH$_3$C$_6$H$_4$)$_2$PBH[As(CH$_3$)$_2$]]$_3$ |
| XXXI | Ca(SH)$_2$ | [(C$_{12}$H$_{25}$)$_2$PBCl$_2$]$_3$ | [(C$_{12}$H$_{25}$)$_2$PB(SH)$_2$]$_3$ |
| XXXII | Be(OH)$_2$ | [(C$_6$H$_{13}$)$_2$PBHI]$_2$(C$_6$H$_{13}$)$_2$PBH$_2$ | [(C$_6$H$_{13}$)$_2$PBH(OH)]$_2$(C$_6$H$_{13}$)$_2$PBH$_2$ |
| XXXIII | NaP(CH$_3$)$_2$ | [(CH$_3$)$_2$PBH$_2$](CH$_3$)$_2$PBHCl | [(CH$_3$)$_2$PBH$_2$]$_2$(CH$_3$)$_2$PBH[P(CH$_3$)$_2$] |
| XXXIV | RbOCH$_3$ | [(C$_2$H$_5$)$_2$PBHI]$_2$(C$_2$H$_5$)$_2$PBH$_2$ | [(C$_2$H$_5$)$_2$PBH(OCH$_3$)]$_2$(C$_2$H$_5$)$_2$PBH$_2$ |
| XXXV | Hg(SCN)$_2$ | [(C$_2$H$_5$)CH$_3$PBHCl]$_{50}$N(CH$_3$)$_3$ | [(C$_2$H$_5$)CH$_3$PBH(SCN)]$_{50}$N(CH$_3$)$_3$ |
| XXXVI | Zn(NH$_3$)$_2$ | [(C$_6$H$_5$CH$_2$)$_2$PBH$_2$]$_2$(C$_6$H$_5$CH$_2$)$_2$PBHI | [(C$_6$H$_5$CH$_2$)$_2$PBH$_2$]$_2$(C$_6$H$_5$CH$_2$)$_2$PBH(NH$_2$) |
| XXXVII | Al(OH)$_3$ | [(CH$_3$)$_2$PBHI]$_3$ | [(CH$_3$)$_2$PBH(OH)]$_3$ |
| XXXVIII | NaSECH$_3$ | [(C$_2$H$_5$)$_2$PBH$_2$]$_2$(C$_2$H$_5$)$_2$PBHBr | [(C$_2$H$_5$)$_2$PBH$_2$]$_2$(C$_2$H$_5$)$_2$PBH(SeCH$_3$) |
| XXXIX | NaSC$_2$H$_5$ | [(C$_8$H$_{17}$)CH$_3$PBHCl]$_{30}$P(CH$_3$)$_3$ | [(C$_8$H$_{17}$)CH$_3$PBH(SC$_2$H$_5$)]$_{30}$P(CH$_3$)$_3$ |
| XL | AgSCN | [(C$_6$H$_5$)CH$_3$PBF$_2$]$_{40}$N(C$_2$H$_5$)$_3$ | [(C$_6$H$_5$)CH$_3$PB(SCN)$_2$]$_{40}$N(C$_2$H$_5$)$_3$ |
| XLI | KOCN | [(CH$_3$)$_2$PBHCl]$_3$ | [(CH$_3$)$_2$PBH(NCO)]$_3$ |
| XLII | LiOSO$_2$C$_6$H$_5$ | [(neo-C$_5$H$_{11}$)CH$_3$PBH$_2$]$_2$(neo-C$_5$H$_{11}$)CH$_3$PBHI | [(neo-C$_5$H$_{11}$)CH$_3$PBH$_2$]$_2$(neo-C$_5$H$_{11}$)CH$_3$PBH(OSO$_2$C$_6$H$_5$) |

As illustrated in the foregoing examples, the process of the present invention can be carried out at a temperature within a range of from about 25° C. to about 300° C., and preferably within a temperature range of from about 35° C. to about 200° C; however, temperature is not critical so long as the decomposition temperatures of the reactants and products are not exceeded.

The reaction can be carried out in the presence of a solvent or not, as desired. Preferred solvents which can be used according to the present invention include: aliphatic ethers such as diamyl ether, diheptyl ether, isobutyl neopentyl ether, a diisopropyl ether, dimethyl ether, ethylene glycol dimethylether, ethylene glycol diethylether, ethylene glycol dipropylether, ethylene glycol dibutylether, diethylene glycol dimethylether, diethylene glycol diethylether, diethylene glycol dipropylether, diethylene glycol dibutylether, triethylene glycol dimethylether, triethylene glycol diethylether, triethylene glycol dipropylether, triethylene glycol dibutylether, triethylene glycol dipropylether, triethylene glycol dibutylether, tetraethylene glycol dimethylether, tetraethylene glycol diethylether, diethyl ether, dipropyl ether, butyl ethyl ether, hexyl methyl ether; arene ethers such as anisole, phenetole, diphenyl ether, veratrole, benzyl phenyl ether; cyclic ethers such as tetrahydrofuran, dioxane, tetrahydropyran; arene or aliphatic hydrocarbons such as diisoamyl, hexane, n-hexadecane, cyclohexane, iso-octane, cyclopentane, trimethylpentane, 2-methylpentane, isopentane, methylcyclobexane, benzene, octadeacyclohexane, toluene, p-xylene, naphtha, butylbenzene, ethylbenzene, cumene, octadecylbenzene; alcohols such as ethylene glycol, methanol, i-propanol, ethanol, n-propanol, n-butanol, s-butanol, diethylene glycol, triethylene glycol, cyclohexanol, n-hexanol, 1,2-propanediol; ketones such as methyl ethyl ketone, acetone, acetophenone, methyl i-propyl ketone, diethyl ketone, cyclohexanone, methyl n-butyl ketone; amines such as butylamine, cyclohexylamine, piperidine, pyridine, aniline, N,N-dimethylanilene, hexylamine, p-toluidine, N,N-dimethylcyclohexylamine, 2-picoline; amides such as dimethyl formamide, formamide, methylformamide, dimethylacetamide, acetamide methylacetamide; sulfones and sulfoxides such as dimethylsulfoxide, diethylsulfoxide, dimethylsulfone, diethylsulfone, methyl ethyl sulfone, methyl ethyl sulfoxide, and the like.

Mixtures of solvents can be employed if desired. The absolute aliphatic alcohol solvents are particularly useful because they are inert to the reactants and product, inexpensive, and readily available.

The substituents, $R_1$, $R_2$, $R_3$, $R_4$, $R_5$, $R_6$ and E, as defined above, can be monovalent alicyclic, acyclic or arene substituents. Typical examples of these monovalent substituents include: aryl substituents such as phenyl, biphenylyl, naphthyl, and indanyl; alkaryl substituents such as cumenyl, tolyl, xylyl, mesityl, benzyl, phenylethyl, phenethyl, diphenylmethyl, α-methylbenzyl, trityl, 2-methylbenzyl and 3-phenylpropyl; alkyl substituents such as methyl, ethyl, propyl, butyl, amyl, neopentyl, decyl, hexyl, 2-methylpentyl, 5-methylhexyl, dodecyl and isooctyl; and cycloalkyl substituents such as cyclohexyl, cyclopentyl, cycloheptyl, 4-methylcyclohexyl, 2,4,6-trimethylcyclohexyl and 3-isopropylcyclopentyl. Preferred substituents include the aryl substituent, phenyl;; the alkaryl substituents, lower alkyl substituted phenyl; the lower alkyl substituents having from 1 to 12 carbon atoms; and the cycloalkyl substituents having 5 or 6 annular carbon atoms. These substituents have been found to produce the most desirable results. The most preferred substituents are the lower alkyl substituents having from 1 to 12 carbon atoms and the phenyl radical because the reactions proceed easily and the products are particularly useful and stable compounds.

The bivalent substituents, $R_3$ and $R_4$, when taken together as one single substituent, and $R_5$ and $R_6$, when taken together as one substituent, and R, as defined above, can be any of the bivalent arene, alicyclic or acyclic substituents. Typical examples of these bivalent substituents include: arylene substituents such as phenylene, naphthylene, acenaphthenylene and biphenylene; alkarylene substituents such as durylene, benzylidene, xylylene and tolylene; alkylene substituents such as methylene, ethylene, hexamethylene, neopentylene, isobutylene, propylene and tetramethylene; and cycloalkylene substituents such as cyclohexylene and cyclopentylene. Preferred substituents include the aryl substituent, phenylene; the alkarylene substituents which are lower alkyl substituted phenylene; the lower alkylene substituents having from 1 to 12 carbon atoms; and the cycloalkylene substituents having 5 or 6 annular carbon atoms. The most preferred substituents are the lower alkylene substituents having from 1 to 12 carbon atoms. These substituents have been found to produce the most desirable results and the reactions proceed easily in their presence.

The anion, Y, described above with reference to the metallic salt, is the functional substituent which is positioned on the boron atom of a phosphinoborine polymer according to this invention. These highly reactive functional substituents provide a means for attaching a wide variety of other substituents to the phosphinoborine polymers. Heretofore, it has been impossible to attach most of these substituents to these polymers. The reactivity of the cyanide, isocyanate, thiocyanate and secondary phosphino substituents is well known. These substituents when attached to phosphinoborine polymers according to this invention, will undergo substantially all of the many conventional reactions known to the art. Because of their wide application in many reactions, these substituents are the most preferred according to this invention.

The other anion substituents, Y, described above, will also undergo, when positioned on these polymers, substantially all of the reactions which are known for these substituents by those skilled in the art.

The B-halophosphinoborine polymers used according to this invention include the following:

[(CH$_3$)$_2$PBH$_2$]$_2$(CH$_3$)$_2$PBHF
(CH$_3$)$_2$PBH$_2$[(CH$_3$)$_2$PBHI]$_2$
[(CH$_3$)$_2$PBHCl]$_3$
[(CH$_3$)$_2$PBHI]$_3$
[(CH$_3$)$_2$PBHCl]$_3$(CH$_3$)$_2$PBCl
[(CH$_3$)$_2$PBHBr]$_2$(CH$_3$)$_2$PBBr$_2$
[(CH$_3$)$_2$PBHI]$_2$(CH$_3$)$_2$PBI$_2$
(CH$_3$)$_2$PBHCl[(CH$_3$)$_2$PBCl$_2$]$_2$
(CH$_3$)$_2$PBHBr[(CH$_3$)$_2$PBBr$_2$]$_2$
(CH$_3$)$_2$PBHI[(CH$_3$)$_2$PBI$_2$]$_2$
[(CH$_3$)$_2$PBF$_2$]$_3$
[(CH$_3$)$_2$PBH$_2$]$_3$(CH$_3$)$_2$PBHBr
[(CH$_3$)$_2$PBHF$_2$]$_3$
[(C$_2$H$_5$)$_2$PHF$_2$]$_3$
[(CH$_3$)$_2$PBH$_2$]$_2$(CH$_3$)$_2$PBHCl
(CH$_3$)$_2$PBH$_2$[(CH$_3$)$_2$PBHCl]$_2$
[(CH$_3$)$_2$PBCl$_2$]$_3$
CH$_3$(C$_2$H$_5$)PBHCl[CH$_3$(C$_2$H$_5$)PBCl$_2$]$_2$
[CH$_3$(C$_2$H$_5$)PBCl$_2$]$_3$
[(CH$_3$)$_2$PBH$_2$]$_2$(CH$_3$)$_2$PBHBr
(CH$_3$)$_2$PBH$_2$[(CH$_3$)$_2$PBHBr]$_2$
[(CH$_3$)$_2$PBHBr]$_3$
[(CH$_3$)$_2$PBBr$_2$]$_3$
[(CH$_3$)$_2$PBH$_2$]$_2$(CH$_3$)$_2$PBHI
[(CH$_3$)$_2$PBI$_2$]$_3$
[(CH$_3$)$_2$P]$_4$B$_4$H$_2$Cl$_6$
[(CH$_3$)$_2$PBCl$_2$]$_{40}$N(C$_2$H$_5$)$_3$

The following specific compounds exemplify the general structure of the polymers used in this invention:

A typical B-halophosphinoborine polymer which is characteristic of the structure of polymers having the general Formula 1 [R$_4$R$_3$PBR$_1$R$_2$]$_n$ is the trimeric B-bromo-P-dimethylphosphinoborine where $n$ equals 3 having the structural formula:

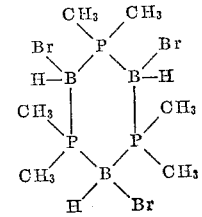

A typical B-halophosphinoborine polymer which is characteristic of the structure of polymers having the general Formula 2 BH$_3$[R$_4$R$_3$PBR$_1$R$_2$]$_n$A is the linear polymer B-iodo-P-dimethylphosphinoborine having a degree of polymerization of 3, terminated with an acidic borine group on one end and a basic secondary phosphine on the other and having the structural formula:

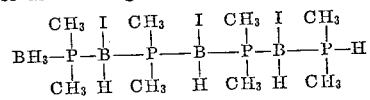

The metallic substituent M, can be any of the following Group Ia metals, lithium, sodium, potassium, rubidium or cesium; Group Ib metals, copper and silver; Group IIa metals, beryllium, magnesium, calcium, strontium, barium; Group IIb metals, zinc, cadmium, mercury; Group IIIa metals, boron and aluminum; Group IVa metals, tin and lead. The best yields of substituted polymers are generally obtained when the metallic elements are either Group Ia or Group IIa elements. For this reason, Group Ia and Group IIa metallic elements are the preferred substituents. For solubility reasons, Group Ia elements, generally give the best yields of substituted polymer. Group Ia elements are, therefore, the most preferred according to this invention.

The terminating group, —A, in polymer 2 is basic in nature. Substantially any groups, organic or inorganic, which are basic enough to attach to the acidic boron group, which is the end of the polymer chain, will terminate the chain. Convenient terminating groups include the secondary and tertiary phosphines and amines which can be represented by the general formula —$D(R_5)_3$, where D is either phosphorus or nitrogen and $R_5$ is hydrogen or as defined above with the provision that no more than one $R_5$ in any one group is hydrogen. The nature of the inert basic end groups is not critical in this invention since it does not enter into the reaction in any way and is present only because any linear polymer must be terminated in order to prevent cyclization.

The integer $n$, which is indicative of the degree of polymerization of polymers 1 through 2, can range from two for the simple linear polymers and three for the simple cyclic polymers through 3,000 and even higher.

As will be understood by those skilled in the art, what has been described is the preferred embodiment of the invention; however, many modifications, changes and substitutions can be made therein without departing from the scope and the spirit of the following claims.

We claim:

1. A B-functionally substituted phosphinoborine polymer $[R_4R_3PB(E)_2]_n$ wherein E is independently selected for each position on each monomeric unit from the group consisting of hydrogen, phenyl, lower alkyl substituted phenyl, lower alkyl, cycloalkyl substituents having from 5 to 6 annular carbon atoms and Y substituents, at least one of said E substituents being Y in said polymer;

Y is independently selected for each position on each monomeric unit from the group consisting of —CN, —NCO, —NCS, —$N(C_2H_5)_2$, —$NHC_6H_{11}$, —$NH_2$, —SH, —$SCH_3$, —$SC_2H_5$, —$PH(CH_3)$, —$P(CH_3)_2$, —$SO_3C_6H_5$, —$NO_2$, —$N_3$, —SCN, —$As(CH_3)_2$, —$OC_2H_5$, —$OC_6H_5$, —OH, —$OCH_3$, —$SeCH_3$, —$TeC_6H_5$, —$SO_3CH_3$ and —$SO_3C_6H_4Br$ substituents;

$R_3$ and $R_4$ are selected for each monomeric unit from the group consisting of two independently selected phenyl, lower alkyl substituted phenyl, lower alkyl and cycloalkyl substituents having from 5 to 6 annular carbon atoms, and taken together, one single bivalent lower alkylene, phenylene, lower alkyl substituted phenylene, and cycloalkylene substituents containing from 5 to 6 annular carbon atoms; and $n$ is an integer ranging from about 2 to 3,000 and is indicative of the degree of polymerization of said polymer.

2. A B-functionally substituted phosphinoborine polymer $BH_3[R_4R_3PB(E)_2]_nA$ wherein E is independently selected for each position on each monomeric unit from the group consisting of hydrogen, phenyl, lower alkyl substituted phenyl, lower alkyl, cycloalkyl substituents having from 5 to 6 annular carbon atoms and Y substituents, at least one of said E substituents being Y in said polymer;

Y is independently selected for each position on each monomeric unit from the group consisting of —CN, —NCO, —NCS, —$N(C_2H_5)_2$, —$NHC_6H_{11}$, —$NH_2$, —SH, —$SCH_3$, —$SC_2H_5$, —$PH(CH_3)$, —$P(CH_3)_2$, —$SO_3C_6H_5$, —$NO_2$, —$N_3$, —SCN, —$As(CH_3)_2$, —$OC_2H_5$, —$OC_6H_5$, —OH, —$OCH_3$, —$SeCH_3$, —$TeC_6H_5$, —$SO_3CH_3$ and —$SO_3C_6H_4Br$ substituents;

$R_3$ and $R_4$ are selected for each monomeric unit from the group consisting of two independently selected phenyl, lower alkyl substituted phenyl, lower alkyl and cycloalkyl substituents having from 5 to 6 annular carbon atoms, and taken together, one single bivalent lower alkylene, phenylene, lower alkyl substituted phenylene, and cycloalkylene substituents containing from 5 to 6 annular carbon atoms;

$n$ is an integer ranging from about 2 to 3,000, and is indicative of the degree of polymerization of said polymers; and A is a basic terminating group having the formula —$D(R_5)_3$, wherein D is selected from the group consisting of phosphorous and nitrogen and $R_5$ is selected from the group consisting of hydrogen, alicyclic, acyclic and arene substituents with the provision that no more than one $R_5$ in any one group is hydrogen.

3. $[(CH_3)_2PBH_2][(CH_3)_2PBH(NCO)]_2$.

4. $[(CH_3)_2PBH(NCO)]_3$.

5. $[(CH_3)_2PB(CN)_2]_3$.

6. The phosphinoborine polymer having the formula:

$$BH_3[(CH_3)_2PB(CN)_2]_nA$$

wherein

A is a basic terminating group having the formula —$D(R_5)_3$, wherein D is selected from the group consisting of phosphorous and nitrogen and $R_5$ is selected from the group consisting of hydrogen, alicyclic, acyclic and arene substituents with the provision that no more than one $R_5$ in any one group is hydrogen; and $n$ is an integer ranging from 2 to 3,000, and is indicative of the degree of polymerization of said polymers.

References Cited

UNITED STATES PATENTS

| | | | |
|---|---|---|---|
| 2,866,801 | 12/1958 | Himel | 260—453 |
| 2,892,873 | 6/1959 | Haber et al. | 260—606.5 |
| 3,012,076 | 12/1961 | Burg et al. | 260—2 |
| 3,025,326 | 3/1962 | Burg et al. | 260—2 |
| 3,188,345 | 6/1965 | Burg et al. | 260—543 |
| 3,240,807 | 3/1966 | Wagner et al. | 260—543 |
| 3,240,815 | 3/1966 | Wagner et al. | 260—606.5 |

FOREIGN PATENTS

| | | |
|---|---|---|
| 848,656 | 9/1960 | Great Britain. |
| 852,970 | 11/1960 | Great Britain. |
| 611,563 | 12/1960 | Canada. |

OTHER REFERENCES

Theilheimer, "Synthetic Methods of Organic Chemistry," vol. 1(C) 1948, par. 205, vol. 2(C) 1949 at par. 728.

Burg, Journal of Chemical Education, vol. 37, No. 9, September 1960, pp. 482–490 relied on.

DONALD E. CZAJA, *Primary Examiner.*

M. JACOBS, F. McKELVEY, *Assistant Examiners.*